United States Patent
Kanzaki et al.

(10) Patent No.: US 10,606,448 B2
(45) Date of Patent: Mar. 31, 2020

(54) SEARCHING AND DISPLAYING CHILD OBJECTS OF A PARENT OBJECT

(71) Applicant: International Business Machines Corporation, Armonk, NY (US)

(72) Inventors: Eisuke Kanzaki, Kanagawa (JP); Akira Sudoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 15/397,869

(22) Filed: Jan. 4, 2017

(65) Prior Publication Data
US 2018/0188904 A1    Jul. 5, 2018

(51) Int. Cl.
G06F 3/048    (2013.01)
G06F 3/0482   (2013.01)
G06F 16/245   (2019.01)

(52) U.S. Cl.
CPC .......... *G06F 3/0482* (2013.01); *G06F 16/245* (2019.01)

(58) Field of Classification Search
CPC ..................... G06F 3/0482; G06F 17/30424
See application file for complete search history.

(56) References Cited

U.S. PATENT DOCUMENTS

| | | |
|---|---|---|
| 7,650,575 B2 | 1/2010 | Cummins et al. |
| 7,703,045 B1 | 4/2010 | Kawahara et al. |
| 9,395,906 B2 | 7/2016 | Lee |
| 10,216,408 B2 | 2/2019 | Dale |
| 10,241,652 B2 | 3/2019 | Kanzaki |
| 2003/0139901 A1* | 7/2003 | Forman ................ G06F 17/18 702/179 |
| 2008/0207188 A1 | 8/2008 | Ahn et al. |
| 2013/0042207 A1 | 2/2013 | Matthews et al. |
| 2014/0298268 A1 | 10/2014 | Kang et al. |
| 2015/0005064 A1* | 1/2015 | Lee .................... A63F 13/00 463/31 |

(Continued)

FOREIGN PATENT DOCUMENTS

| | | |
|---|---|---|
| JP | 2006114049 A | 4/2006 |
| JP | 2007193465 A | 8/2007 |

(Continued)

OTHER PUBLICATIONS

Appendix P List of IBM Patents or Applications Treated as Related Dated Dec. 28, 2017. Two Pages.

(Continued)

*Primary Examiner* — David E Choi
(74) *Attorney, Agent, or Firm* — Edward P. Li

(57) ABSTRACT

A method, a computer program product, and a computer system for searching and displaying child objects of a parent object based on a drag event. The child objects are associated with the parent object. A computer displays a parent object, in response to that a user selects the parent object. The computer further receives from the user a drag event on the parent object. The computer further search child objects, based on a direction of a dragging movement in the drag event, wherein a search rule is predetermined for the direction of the dragging movement. The computer further displays the child objects, wherein how many of the child objects are displayed is based on a distance of the dragging movement in the drag event.

12 Claims, 9 Drawing Sheets

(56) References Cited

U.S. PATENT DOCUMENTS

| | | | |
|---|---|---|---|
| 2015/0026573 A1* | 1/2015 | Meng | G06F 16/958 |
| | | | 715/716 |
| 2015/0143243 A1* | 5/2015 | Balfe | G06F 17/2241 |
| | | | 715/732 |
| 2015/0378564 A1* | 12/2015 | Ramanathan | G06T 11/206 |
| | | | 715/738 |
| 2016/0103567 A1* | 4/2016 | Wengelnik | G06F 3/04842 |
| | | | 715/779 |
| 2017/0192942 A1 | 7/2017 | Craik | |
| 2017/0277269 A1* | 9/2017 | Kawahara | G06F 3/0482 |
| 2018/0188904 A1* | 7/2018 | Kanzaki | G06F 16/245 |
| 2018/0188909 A1* | 7/2018 | Kanzaki | G06F 16/245 |

FOREIGN PATENT DOCUMENTS

| | | |
|---|---|---|
| JP | 2010160655 A | 7/2010 |
| JP | 2010205146 A | 9/2010 |

OTHER PUBLICATIONS

Kanzaki et al. Original U.S. Appl. No. 15/844,589, filed Dec. 17, 2017.

"Drag and drop", Wikipedia, Revised Sep. 14, 2012, 4 pages, <https://en.wikipedia.org/w/index.php?title=Drag_and_drop&oldid=512450855>/.

"Drag and drop", Wikipedia, Revised Dec. 16, 2016, 4 pages, <https://en.wikipedia.org/w/index.php?title=Drag_and_drop&oldid=755160252>.

* cited by examiner

FIG. 2(F)

SEARCHING AND DISPLAYING CHILD OBJECTS OF A PARENT OBJECT

BACKGROUND

The present invention relates generally to searching and displaying objects, and more particularly to searching and displaying child objects of a parent object based on a drag event.

It is time-consuming and troublesome to select one or more desired objects from a lengthy object list. It is desirable that the one or more desired objects are selected readily and quickly from the list. Existing technologies provide a display of all objects; for example, Microsoft® PowerPoint® provides a list of shapes.

SUMMARY

In one aspect, a method for searching and displaying child objects of a parent object based on a drag event is provided. The method is implemented by a computer. The method includes displaying a parent object, in response to that a user selects the parent object. The method further includes receiving from the user a drag event on the parent object. The method further includes searching child objects, based on a direction of a dragging movement in the drag event, wherein the child objects are associated with the parent object, wherein a search rule is predetermined for the direction of the dragging movement. The method further includes displaying the child objects, wherein how many of the child objects are displayed is based on a distance of the dragging movement in the drag event.

In another aspect, a computer program product for searching and displaying child objects of a parent object based on a drag event is provided. The computer program product comprises a computer readable storage medium having program code embodied therewith. The program code executable to display, by a computer, a parent object, in response to that a user selects the parent object. The program code executable to receive from the user, by the computer, a drag event on the parent object. The program code executable to search, by the computer, child objects, based on a direction of a dragging movement in the drag event, wherein the child objects are associated with the parent object, wherein a search rule is predetermined for the direction of the dragging movement. The program code executable to display, by the computer, the child objects, wherein how many of the child objects are displayed is based on a distance of the dragging movement in the drag event.

In yet another aspect, a computer system for searching and displaying child objects of a parent object based on a drag event is provided. The computer system comprises one or more processors, one or more computer readable tangible storage devices, and program instructions stored on at least one of the one or more computer readable tangible storage devices for execution by at least one of the one or more processors. The program instructions are executable to: display a parent object, in response to that a user selects the parent object; receive from the user a drag event on the parent object; search child objects, based on a direction of a dragging movement in the drag event, wherein the child objects are associated with the parent object, wherein a search rule is predetermined for the direction of the dragging movement; and display the child objects, wherein how many of the child objects are displayed is based on a distance of the dragging movement in the drag event.

BRIEF DESCRIPTION OF THE SEVERAL VIEWS OF THE DRAWINGS

FIGS. 2(A)-2(F) shows an example of an approach of searching and displaying child objects of a parent object based on a drag event, in accordance with one embodiment of the present invention.

DETAILED DESCRIPTION

Embodiments of the present invention provide a computer-implemented method, a computer program product, and a computer system for searching and displaying child objects of a parent object based on a drag event. When a parent object is selected and is in dragged state, child objects which are associated with the parent object are made to appear in an order of satisfaction degrees of predetermined search rules, more particularly based on dragging directions and distances.

When a viewable parent object is selected, an action (such as dragging by a user), which is registered in advance for the parent object, is executed for the selected parent object. The search rules vary depending on the direction of the movement of the action. The number of child objects which are displayed varies, depending on the distance of the movement. Within a predetermined time period, when the dragging is performed for twice or more in the same direction, the number of child objects displayed will change and displayed information will change between two dragging operations.

Figure 1:
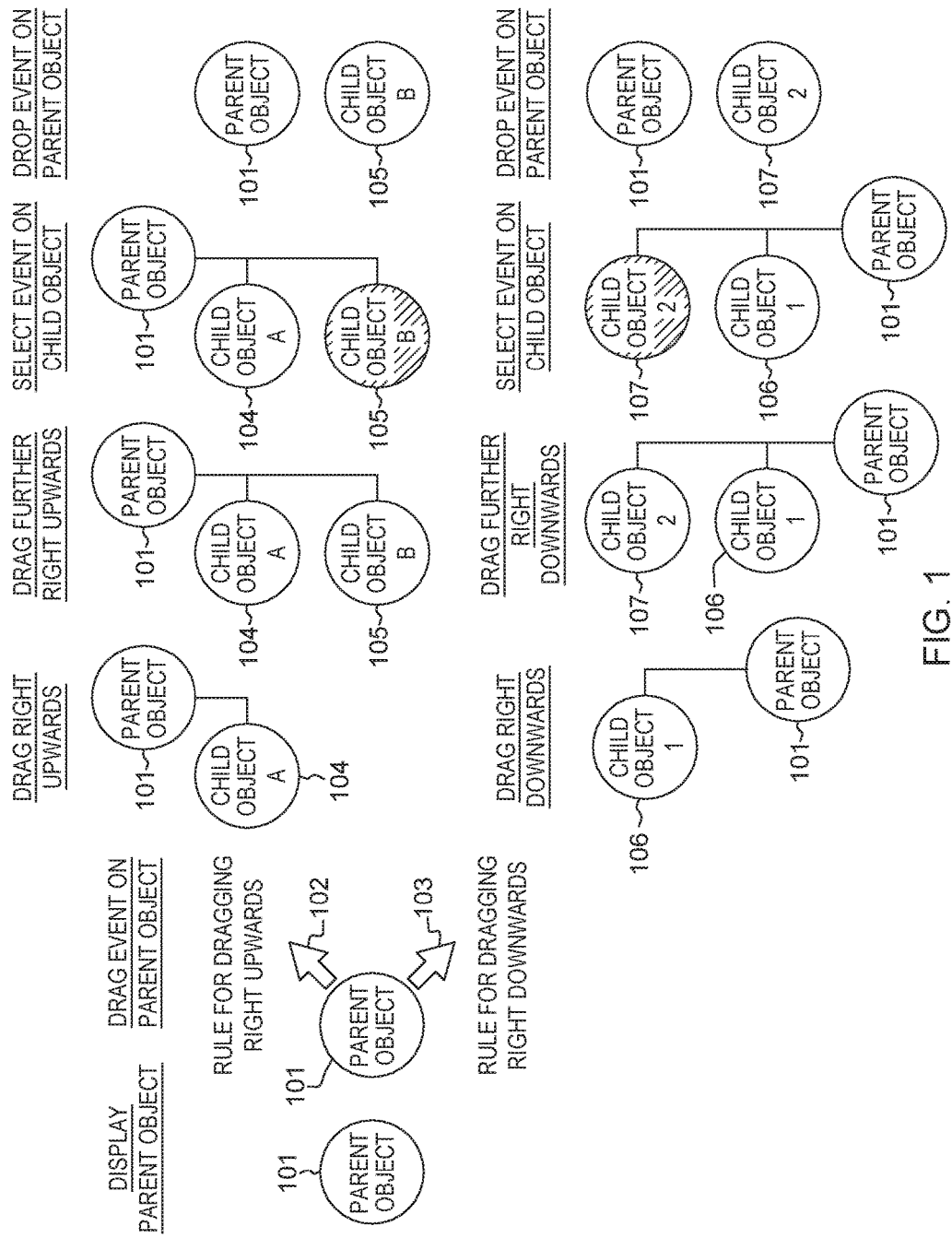
FIG. 1 is a diagram illustrating an approach of searching and displaying child objects of a parent object based on a drag event, in accordance with one embodiment of the present invention.

FIG. 1 is a diagram illustrating an approach of searching and displaying child objects of a parent object based on a drag event, in accordance with one embodiment of the present invention. A computer displays parent object 101. When the computer receives a drag event and parent object 101 is in a dragged stage, the computer displays one or more arrows for directions of dragging operations and displays rules for respective directions. For the illustration purpose, FIG. 1 shows two arrows for two directions of dragging operations—right upward arrow 102 and right downward arrow 103; FIG. 1 also shows a rule for moving right upward in a dragging operation and a rule for moving right downward in a dragging operation.

For the illustration purpose, FIG. 1 shows that the computer displays child object A (numeral 104) along with parent object 101 when the computer receives a dragging operation in the right upward direction. FIG. 1 also shows that the computer displays child object B (numeral 105), along with parent object 101 and child object A 104 (which has been displayed earlier), when receiving a further dragging operation in the right upward direction. The computer receives a select event on child object B (numeral 105).

When the computer receives a drop event, the computer selects parent object 101 and child object B (numeral 105) for performing a task.

For the illustration purpose, FIG. 1 shows that the computer displays child object 1 (numeral 106) along with parent object 101 when the computer receives a dragging operation of in the right downward direction. FIG. 1 also shows that the computer displays child object 2 (numeral 107), along with parent object 101 and child object 1 106 (which has been displayed earlier), when receiving a further dragging operation in the right upward direction. The computer receives a select event on child object 2 (numeral 107). When the computer receives a drop event, the computer selects parent object 101 and child object 2 107 for performing a task.

The approach of searching and displaying child objects of a parent object based on a drag event may be used for various applications, such as a mail tool, a software package for creating electronic presentations, and a search program. Table 1 provides examples of implementing the present invention in different applications.

Figure 2A:
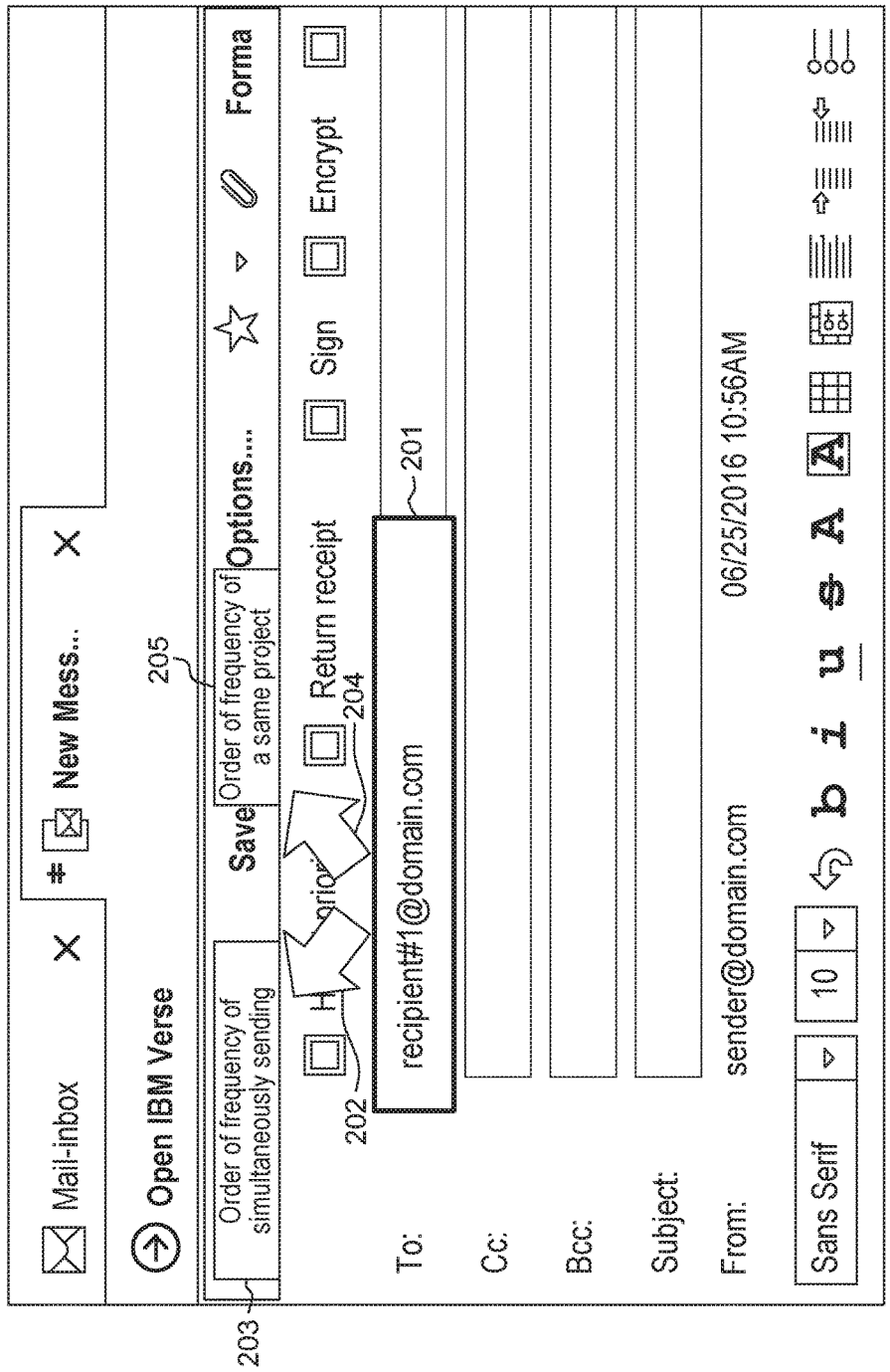
Figure 2B:
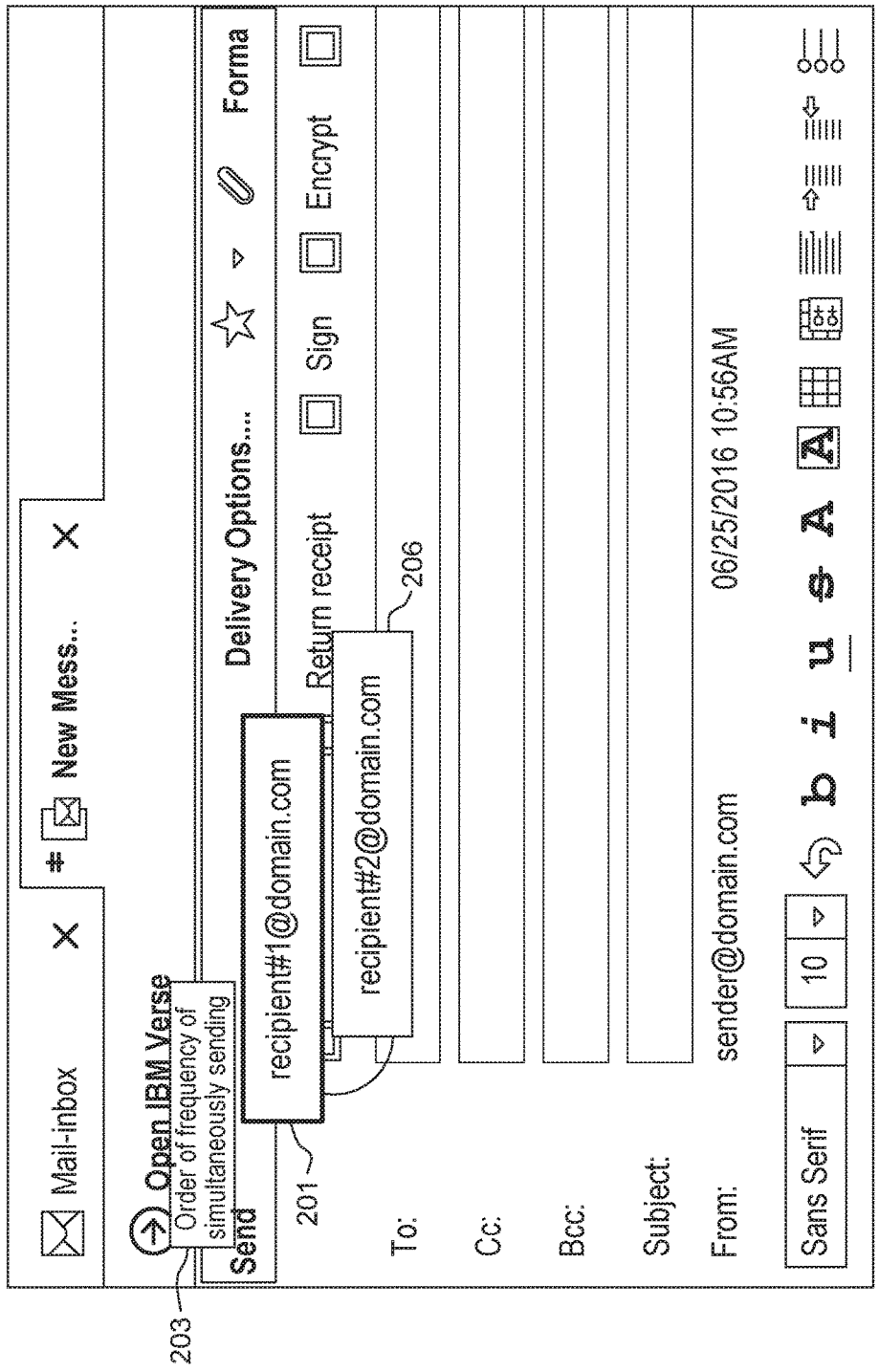
Figure 2C:
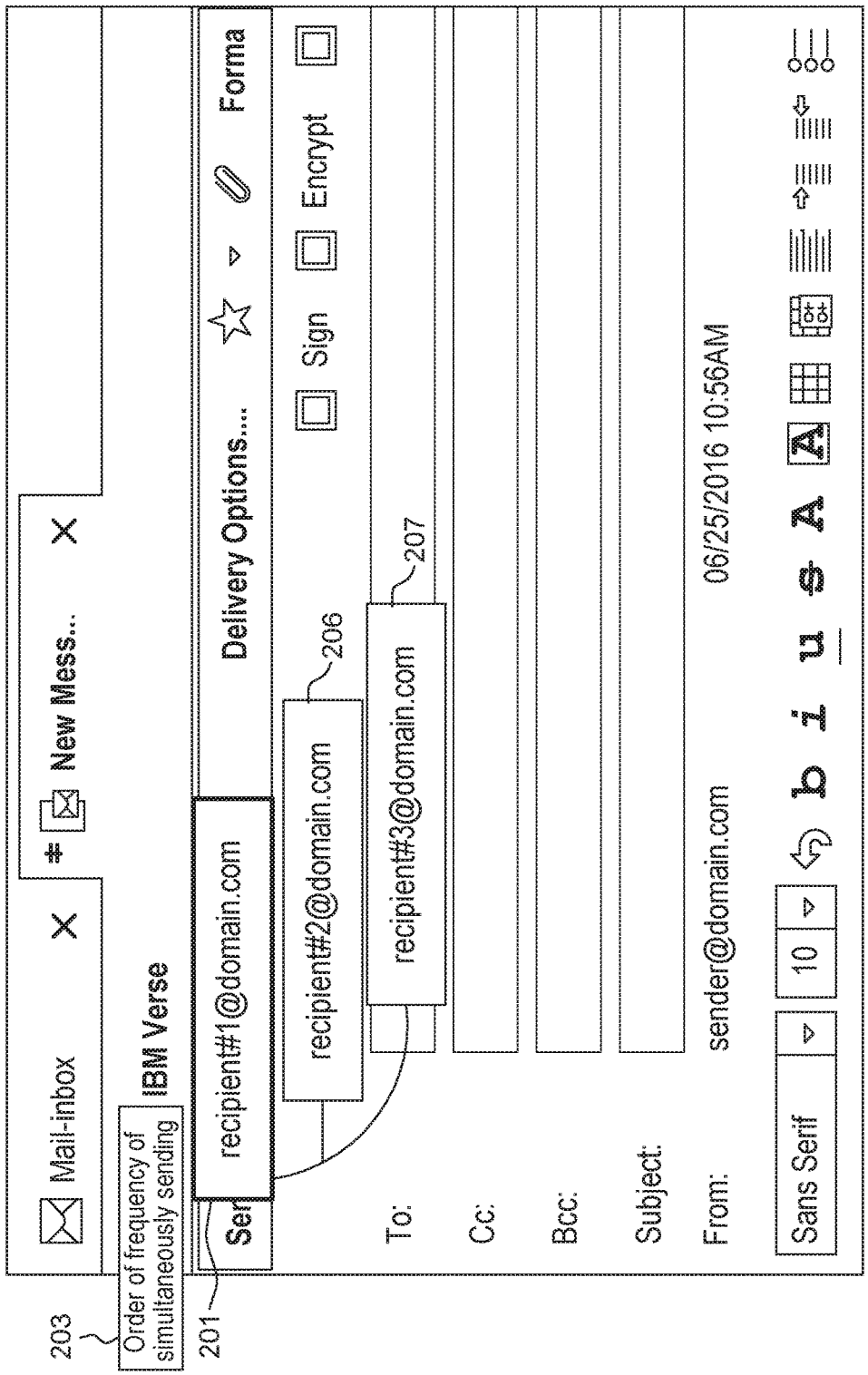

FIG. 2(C) shows that the email application displays a child object after receiving a distance of a further dragging movement in the drag event from the user. In the example shown in FIG. 2(C), the email application additionally displays a second child object, recipient#3@domain.com (numeral 207), based on search and display rule 203.

Figure 2D:
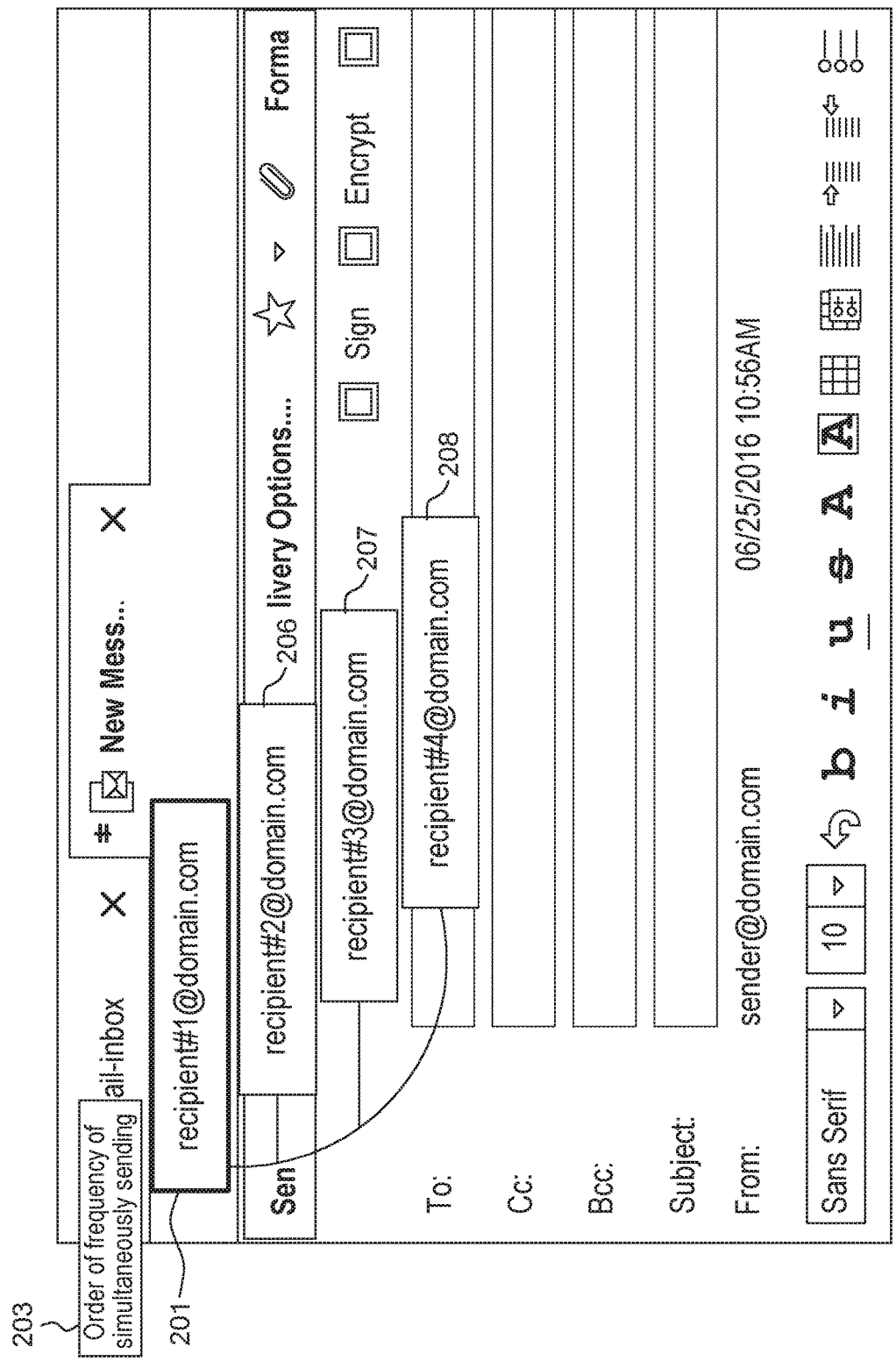

FIG. 2(D) shows that the email application displays a child object after receiving a distance of another further dragging movement in the drag event from the user. In the example shown in FIG. 2(D), the email application displays a third child object, recipient#4@domain.com (numeral 208), based on search and display rule 203.

Figure 2E:
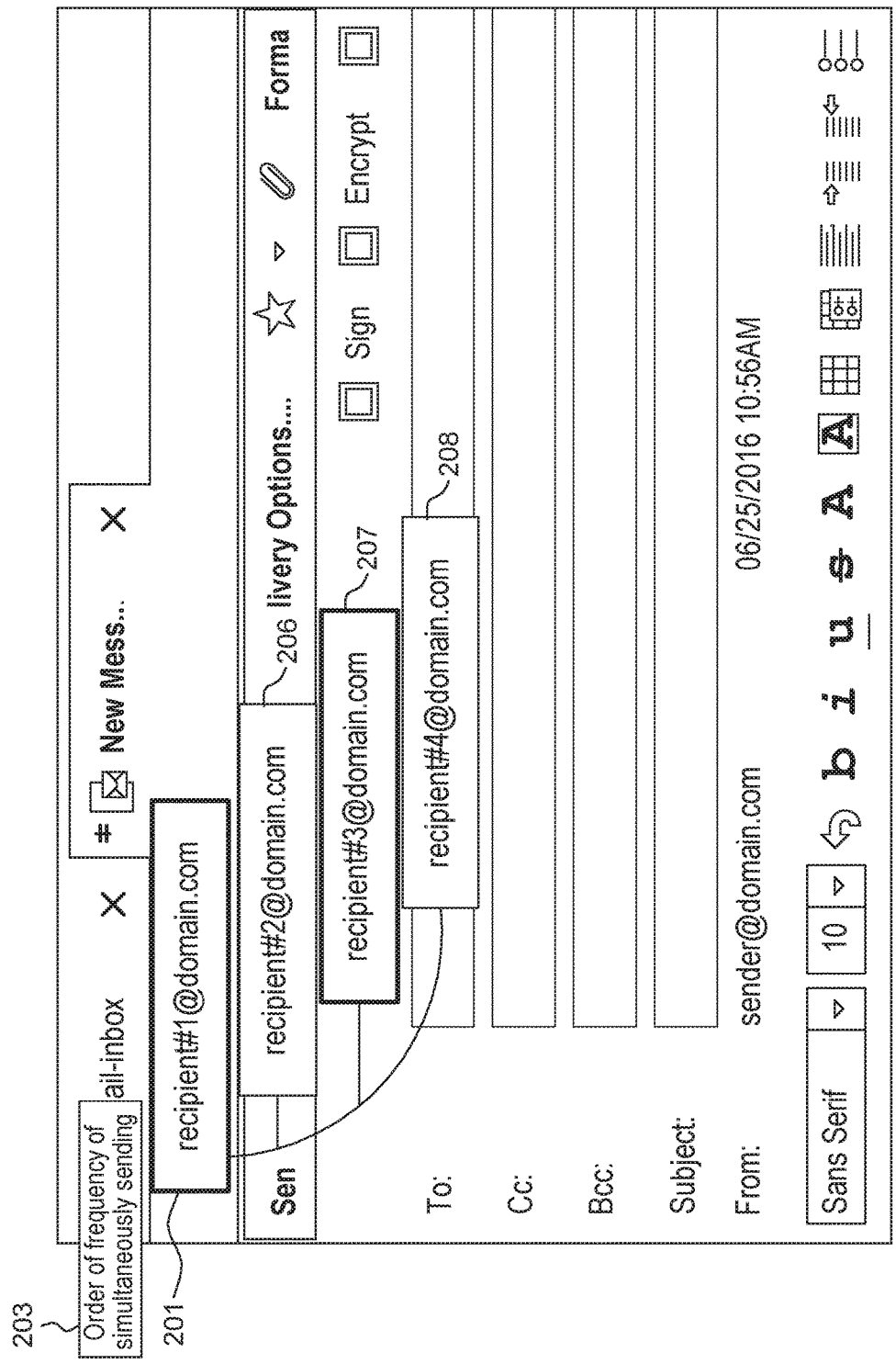
Figure 2F:
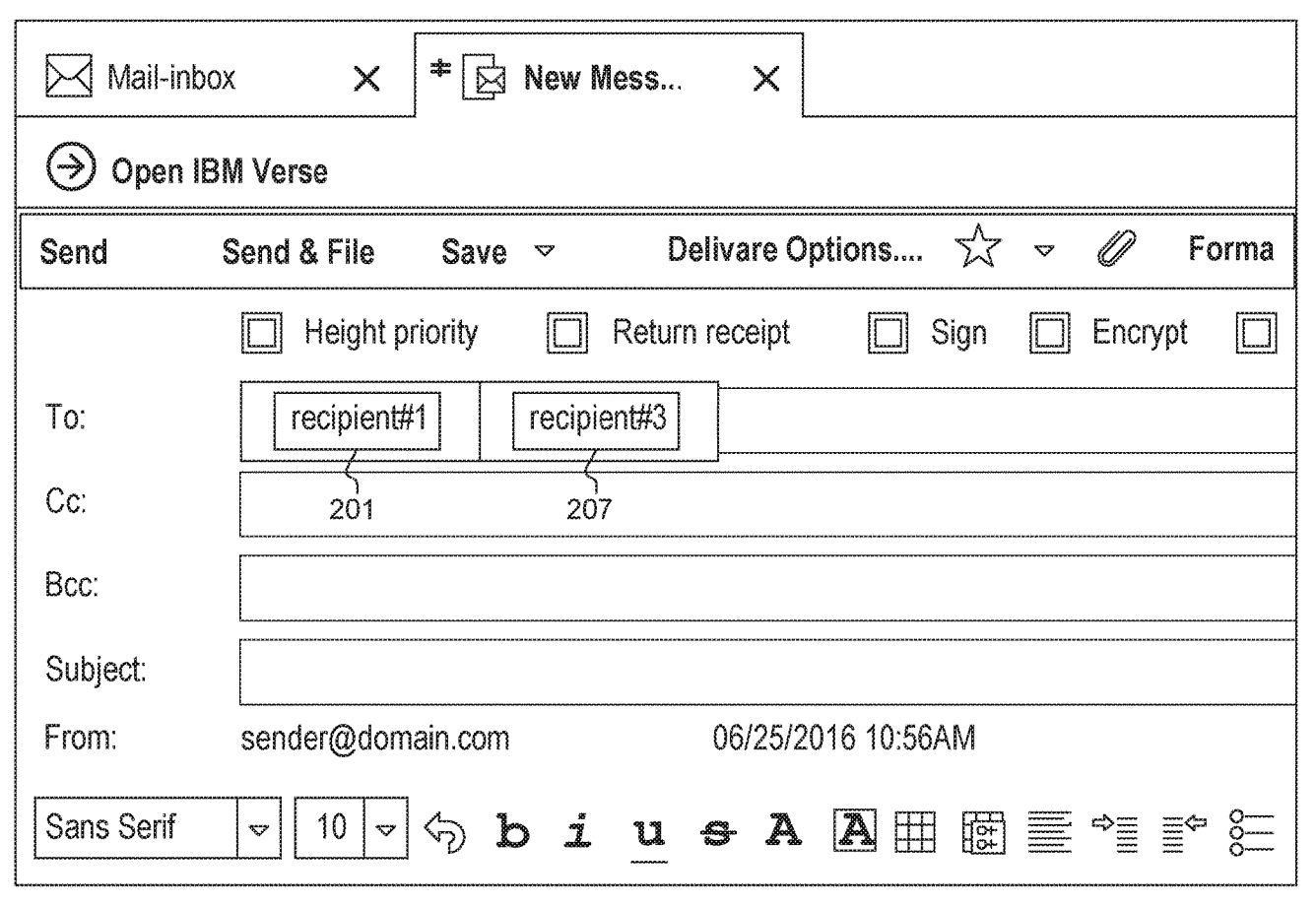

FIG. 2(E) shows that the email application receives a select event from the user. In the example shown in FIG. 2(E), recipient#3@domain.com (numeral 207) is selected by a user. FIG. 2(F) shows that, after receiving a drop event, the email application uses recipient#1@domain.com (numeral 201) and recipient#3@domain.com (numeral 207) as email destinations.

Figure 3:
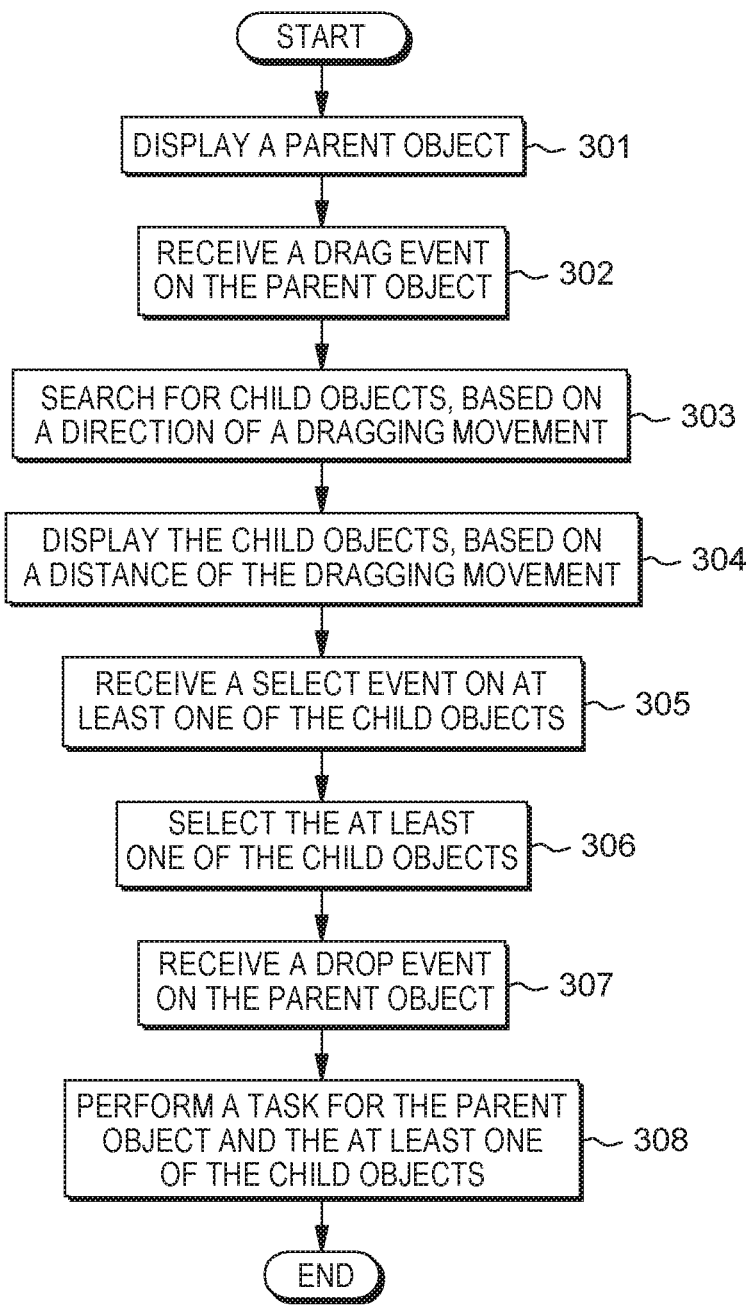
FIG. 3 is a flowchart showing operational steps for searching and displaying child objects of a parent object based on a drag event, in accordance with one embodiment of the present invention.

FIG. 3 is a flowchart showing operational steps for searching and displaying child objects of a parent object

TABLE 1

| | | | Child Objects | |
| --- | --- | --- | --- | --- |
| Applications | Parent Objects | Action | Dragging Direction: right upward | Dragging Direction: right downward |
| Mail Tool | Mail Destination | Add a destination to the destination field | Search Rule: Persons simultaneous sent to Display Rule: Order of frequency | Search Rule: Persons of the same project Display Rule: Order of frequency |
| Package for Creating Electronic Presentations | Shapes Pull-Down Icon | Insert a shape | Search Rule: Rectangular shapes Display Rule: Order of frequency | Search Rule: Speech bubbles Display Rule: Order of frequency |
| Search Program | Magnifying Glass Icon | View the search result | Search and Display Rule: Order of high degree of relevance | Search and Display Rule: Order of update dates of relevance |

FIGS. 2(A)-2(F) show an example of an approach of searching and displaying child objects of a parent object based on a drag event, in accordance with one embodiment of the present invention. FIGS. 2(A)-2(F) show implementation of the approach in an email application.

FIG. 2(A) shows that the email application displays a mail destination name—recipient#1@domain.com (numeral 201). Recipient#1@domain.com (numeral 201) is a parent object and associated with child objects. The child objects are other mail destination names which are relevant to recipient#1@domain.com (numeral 201). When recipient#1@domain.com (numeral 201) is selected by a user and is in the dragged state, the email application displays arrows 202 and 204 and also displays search and display rules. The arrows guide the directions of dragging operations; for example, arrow 202 is left upward and arrow 204 is right upward. The email application displays search and display rule 203 for arrow 202; in this example, the rule is "order of frequency of simultaneously sent". The email application displays search and display rule 205 for arrow 204; in this example, the rule is "order of frequency of a same project".

FIG. 2(B) shows that the email application displays a child object after receiving a distance of a dragging movement in a drag event from the user. In the example shown in FIG. 2(B), the email application displays a first child object, recipient#2@domain.com (numeral 206), based on search and display rule 203.

based on a drag event, in accordance with one embodiment of the present invention. At step 301, a computer displays a parent object. In an example shown in FIG. 1, the computer displays parent object 101. In another example shown in FIG. 2(A), an email application displays an email destination recipient#1@domain.com (numeral 201) which is a parent object.

At step 302, the computer receives from a user a drag event on the parent object. In the example shown in FIG. 1, the computer displays right upward arrow 102 and right downward arrow 103 when the computer receives a drag event on parent object 101. In the example shown in FIG. 1, the computer also displays rules for respective directions. In another example shown in FIG. 2(A), the email application displays arrows 202 and 204 which guide the directions of dragging operations when the email application receives from a user a drag event on the email destination recipient#1@domain.com (numeral 201). In another example shown in FIG. 2(A), the email application also displays rule 203 for arrow 202 and rule 205 for arrow 204.

At step 303, the computer searches for child objects, based on a direction of a dragging movement. At step 304, the computer displays the child objects, based on a distance of the dragging movement. In the example shown in FIG. 1, when the computer receives a dragging operation in the right upward direction, the computer displays child object A (numeral 104); when the computer receives a further dragging operation in the right upward direction, the computer displays child object B (numeral 105). Also in the example shown in FIG. 1, when the computer receives a dragging operation in right downward direction, the computer displays child object 1 (numeral 106); when the computer receives a further dragging operation in the right downward direction, the computer displays child object 2 (numeral 107). In another example shown in FIGS. 2(B)-2(D), the email application displays a first child object (recipient#2@domain.com 206) after receiving a distance of a dragging movement in a drag event from the user, displays a second child object (recipient#3@domain.com 207) after receiving a distance of a further dragging movement, and displays a third child object (recipient#3@domain.com 208) after receiving a distance of a yet further dragging movement.

At step 305, the computer receives a select event on at least one of the child objects. At step 306, the computer selects the at least one of the child objects. In the example shown in FIG. 1, the computer receives a select event on child object B (numeral 105) and selects child object B (numeral 105) in a case of the right upward dragging operation; the computer receives a select event on child object 2 (numeral 107) selects child object 2 (numeral 107) in a case of the right downward dragging operation. In another example shown in FIG. 2(E), the email application receives a select event on a child object (recipient#3@domain.com 207) and selects the child object along with the parent object (recipient#1@domain.com 201).

At step 307, the computer receives a drop event on the parent object. At this step, the computer selects the parent object and the one or more child objects. At step 308, the computer performs a task for the parent object and the one or more child objects (which are selected at step 307). In the example shown in FIG. 1, the computer selects parent object 101 and child object B (numeral 105) for performing a task upon receiving a drop event, in a case of the right upward dragging operation. Also shown in FIG. 1, the computer selects parent object 101 and child object 2 (numeral 107) for performing a task upon receiving a drop event, in a case of the right downward dragging operation. In another example shown in FIG. 2(F), the email application selects the parent object recipient#1@domain.com (numeral 201) and the child object recipient#3@domain.com (numeral 207) as email destinations upon receiving a drop event on the parent object.

Figure 4:
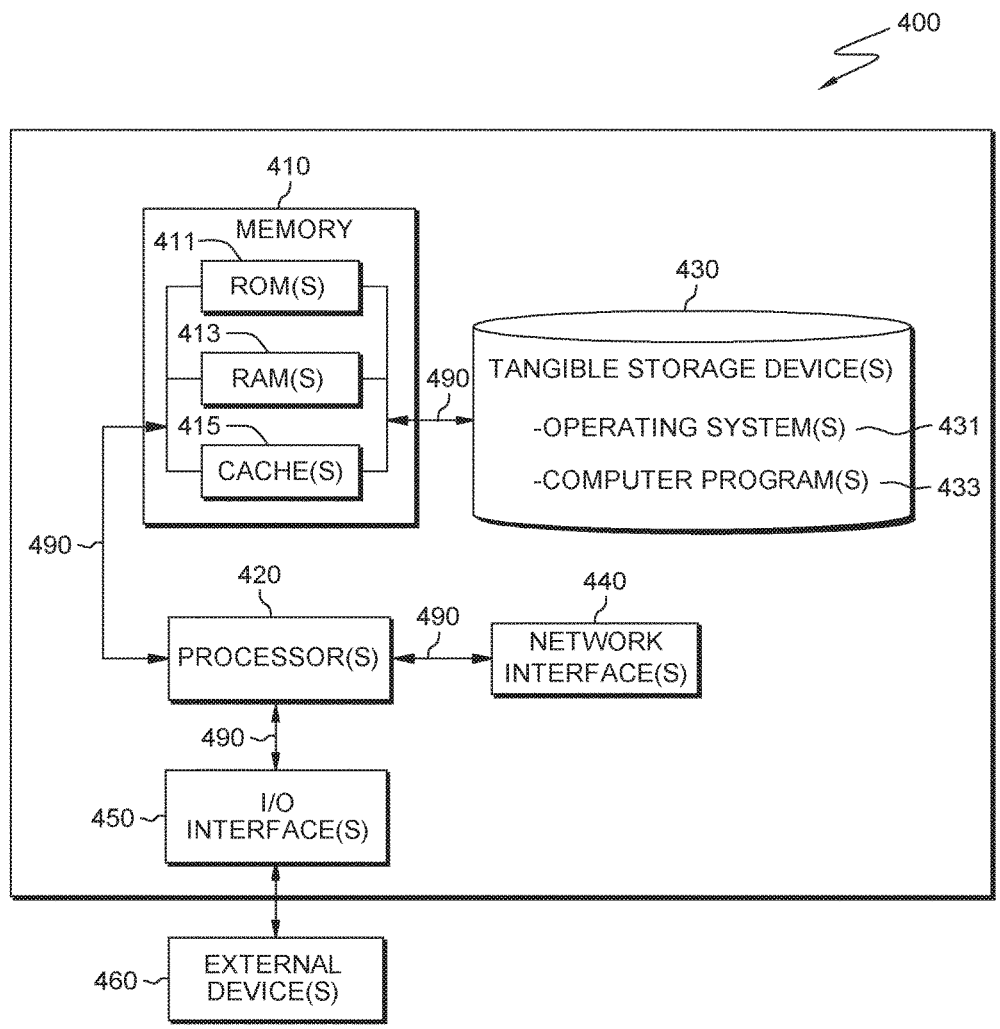
FIG. 4 is a diagram illustrating components of a computer device implementing an approach of searching and displaying child objects of a parent object based on a drag event, in accordance with one embodiment of the present invention.

FIG. 4 is a diagram illustrating components of computer device 400 implementing an approach of searching and displaying child objects of a parent object based on a drag event, in accordance with one embodiment of the present invention. It should be appreciated that FIG. 4 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 4, computer device 400 includes processor(s) 420, memory 410, and tangible storage device(s) 430. In FIG. 4, communications among the above-mentioned components of computer device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430. Computer device 400 further includes I/O interface(s) 450. I/O interface(s) 450 allows for input and output of data with external device(s) 460 that may be connected to computer device 400. Computer device 400 further includes network interface(s) 440 for communications between computer device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for searching and displaying child objects of a parent object based on a drag event, the method comprising:
   displaying, by a computer, a parent object, in response to that a user selects the parent object;
   receiving from the user, by the computer, a drag event on the parent object;
   displaying, by the computer, one or more arrows guiding respective directions of dragging operations on the parent object, while the parent object is in a dragged state in the drag event;
   displaying, by the computer, search rules for the respective directions of the dragging operations, while the parent object is in the dragged state in the drag event;
   in response to receiving the user dragging in a direction of a dragging movement in the drag event, searching, by the computer, child objects of the parent object, based on the direction of the dragging movement in the drag event and based on one of the search rules, wherein the one of the search rules is predetermined for the direction of the dragging movement; and
   displaying, by the computer, the child objects along with the parent object, while the parent object is in a dragged state in the drag event, wherein how many of the child objects are displayed is based on a distance of the dragging movement in the drag event.

2. The method of claim 1, further comprising:
   receiving from the user, by the computer, a select event on at least one of the child objects;
   selecting, by the computer, the at least one of the child objects along with the parent object; and
   performing, by the computer, a task for the parent object and the at least one of the child objects.

3. The method of claim 1, wherein in the drag event the computer receives multiple dragging movements in the direction within a predetermined time period, wherein the computer displays a different number of the child objects and different information in each of the multiple dragging movements.

4. The method of claim 1, further comprising:
   displaying, by the computer, the child objects in an order of satisfaction degrees of a search rule, while the parent object is in a dragged state in the drag event.

5. A computer program product for searching and displaying child objects of a parent object based on a drag event, the computer program product comprising a computer readable storage medium having program code embodied therewith, the program code executable to:
   display, by a computer, a parent object, in response to that a user selects the parent object;
   receive from the user, by the computer, a drag event on the parent object;
   display, by the computer, one or more arrows guiding respective directions of dragging operations on the parent object, while the parent object is in a dragged state in the drag event;
   display, by the computer, search rules for the respective directions of the dragging operations, while the parent object is in the dragged state in the drag event;
   in response to receiving the user dragging in a direction of a dragging movement in the drag event, search, by the computer, child objects of the parent object, based on the direction of the dragging movement in the drag event and based on one of the search rules, wherein the one of the search rules is predetermined for the direction of the dragging movement; and display, by the computer, the child objects along with the parent object, while the parent object is in a dragged state in the drag event, wherein how many of the child objects are displayed is based on a distance of the dragging movement in the drag event.

6. The computer program product of claim 5, further comprising the program code executable to:
receive from the user, by the computer, a select event on at least one of the child objects;
select, by the computer, the at least one of the child objects along with the parent object; and
perform, by the computer, a task for the parent object and the at least one of the child objects.

7. The computer program product of claim 5, wherein in the drag event the computer receives multiple dragging movements in the direction within a predetermined time period, wherein the computer displays a different number of the child objects and different information in each of the multiple dragging movements.

8. The computer program product of claim 5, further comprising the program code executable to:
display, by the computer, the child objects in an order of satisfaction degrees of a search rule, while the parent object is in a dragged state in the drag event.

9. A computer system for searching and displaying child objects of a parent object based on a drag event, the computer system comprising:
one or more processors, one or more computer readable tangible storage devices, and program instructions stored on at least one of the one or more computer readable tangible storage devices for execution by at least one of the one or more processors, the program instructions executable to:
display a parent object, in response to that a user selects the parent object;
receive from the user a drag event on the parent object;
display, by the computer, one or more arrows guiding respective directions of dragging operations on the parent object, while the parent object is in a dragged state in the drag event;
display, by the computer, search rules for the respective directions of the dragging operations, while the parent object is in the dragged state in the drag event;
in response to receiving the user dragging in a direction of a dragging movement in the drag event, search, by the computer, child objects of the parent object, based on the direction of the dragging movement in the drag event and based on one of the search rules, wherein the one of the search rules is predetermined for the direction of the dragging movement; and
display, by the computer, the child objects along with the parent object, while the parent object is in a dragged state in the drag event, wherein how many of the child objects are displayed is based on a distance of the dragging movement in the drag event.

10. The computer system of claim 9, further comprising the program instructions executable to:
receive from the user a select event on at least one of the child objects;
select the at least one of the child objects along with the parent object; and
perform a task for the parent object and the at least one of the child objects.

11. The computer system of claim 9, wherein in the drag event the computer receives multiple dragging movements in the direction within a predetermined time period, wherein the computer displays a different number of the child objects and different information in each of the multiple dragging movements.

12. The computer system of claim 9, further comprising the program instructions executable to:
display the child objects in an order of satisfaction degrees of a search rule, while the parent object is in a dragged state in the drag event.

* * * * *